May 8, 1923.  1,454,234

R. R. GRAEBERT

AUTOMOBILE STEERING WHEEL

Filed Sept. 22, 1922   2 Sheets-Sheet 1

Inventor:
Rudolph R. Graebert
By Jno. G. Elliott
Atty.

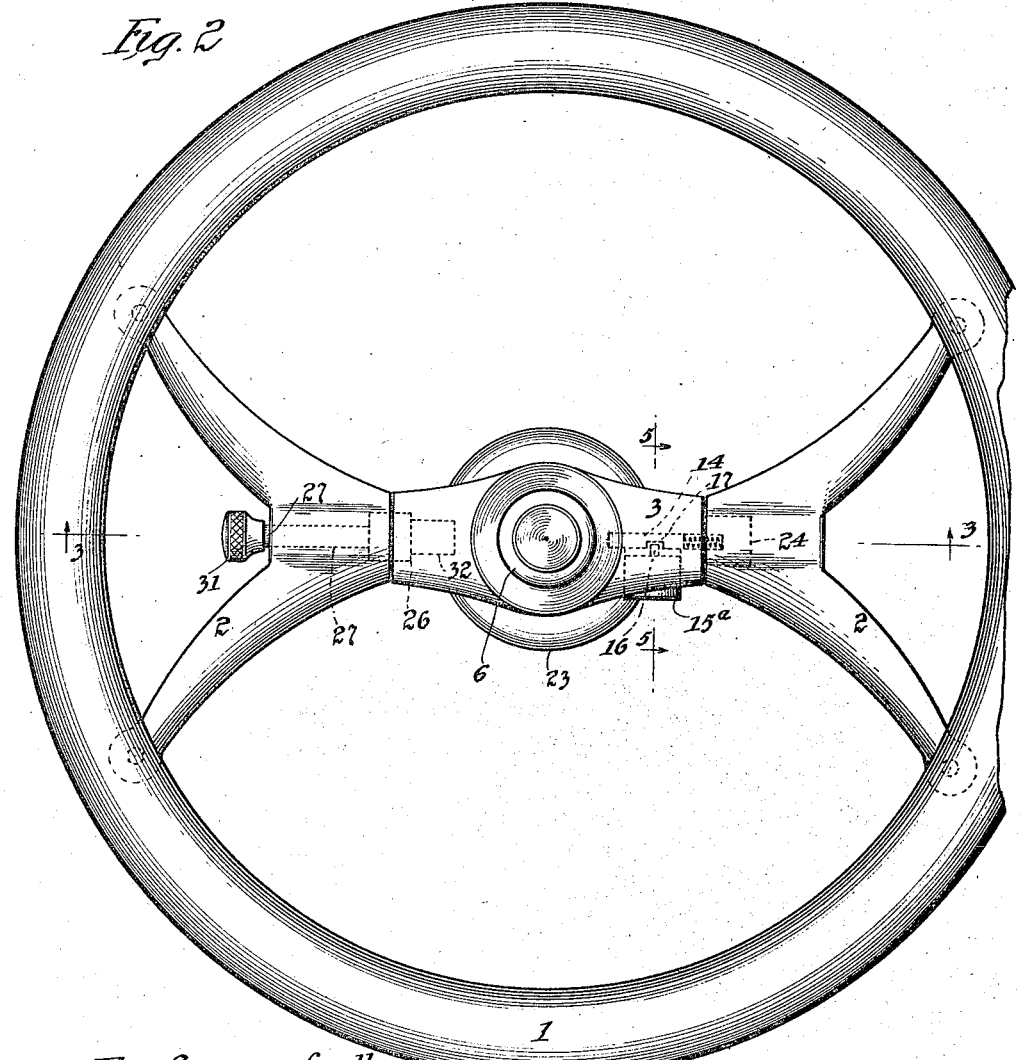

Patented May 8, 1923.

1,454,234

UNITED STATES PATENT OFFICE.

RUDOLPH R. GRAEBERT, OF CHICAGO, ILLINOIS, ASSIGNOR TO CHARLES G. BAUNACH, OF CHICAGO, ILLINOIS.

AUTOMOBILE STEERING WHEEL.

Application filed September 22, 1922. Serial No. 589,908.

*To all whom it may concern:*

Be it known that I, RUDOLPH R. GRAEBERT, a citizen of the United States, and a resident of Chicago, in the county of Cook and State of Illinois, have invented certain new and useful Improvements in Automobile Steering Wheels, of which the following is a specification.

My invention relates to tilting steering wheels for automobiles or trucks, and also to steering wheels adapted to be unlocked or free to spin when the car is standing idle, for preventing surreptitious use of the car by unauthorized persons.

The object of my invention, broadly stated, is to provide a steering wheel normally secured to its post, with means for rendering the wheel free to spin, in combination with means for tilting the wheel, whereby the wheel may be brought into various angular positions around the steering post axis for permitting ready access to the driver's seat from either side of the car.

A further object is to provide a steering wheel adapted to be released from its post for free rotation, with means for permitting a tilting of the wheel about an axis lying in the plane of the steering post axis, whereby the wheel is balanced and rendered capable of maintaining any position which it may assume with a minimum of frictional resistance of the operating parts.

A further object is to provide a steering wheel with a hub normally secured to a steering post and adapted to be released therefrom for free rotation, and a rim framework tiltably mounted on said hub having an automatic securing means and a manually-operated releasing means.

And a further object is to provide a tilting steering wheel with a spring-pressed retractable pivotal pin adapted to serve as a lock in one position and as a trunnion in another.

With these ends in view, my invention finds embodiment in certain features of novelty in the construction, combination and arrangement of parts by which the said objects and other objects are attained, all as hereinafter fully described with reference to the accompanying drawings and more particularly pointed out in the claims.

In said drawings,—

Fig. 2 is a plan view of the steering wheel.

Fig. 3 is a sectional view taken on line 3—3 of Fig. 2, showing the steering wheel unlocked from its post, but locked against tilting movement.

Fig. 4 is a transverse section taken on line 4—4 of Fig. 3, showing the formation of a locking flange employed in the device.

Fig. 5 is a transverse section taken on line 5—5 of Fig. 2, showing the function of a key lock employed in the device.

Figure 1:
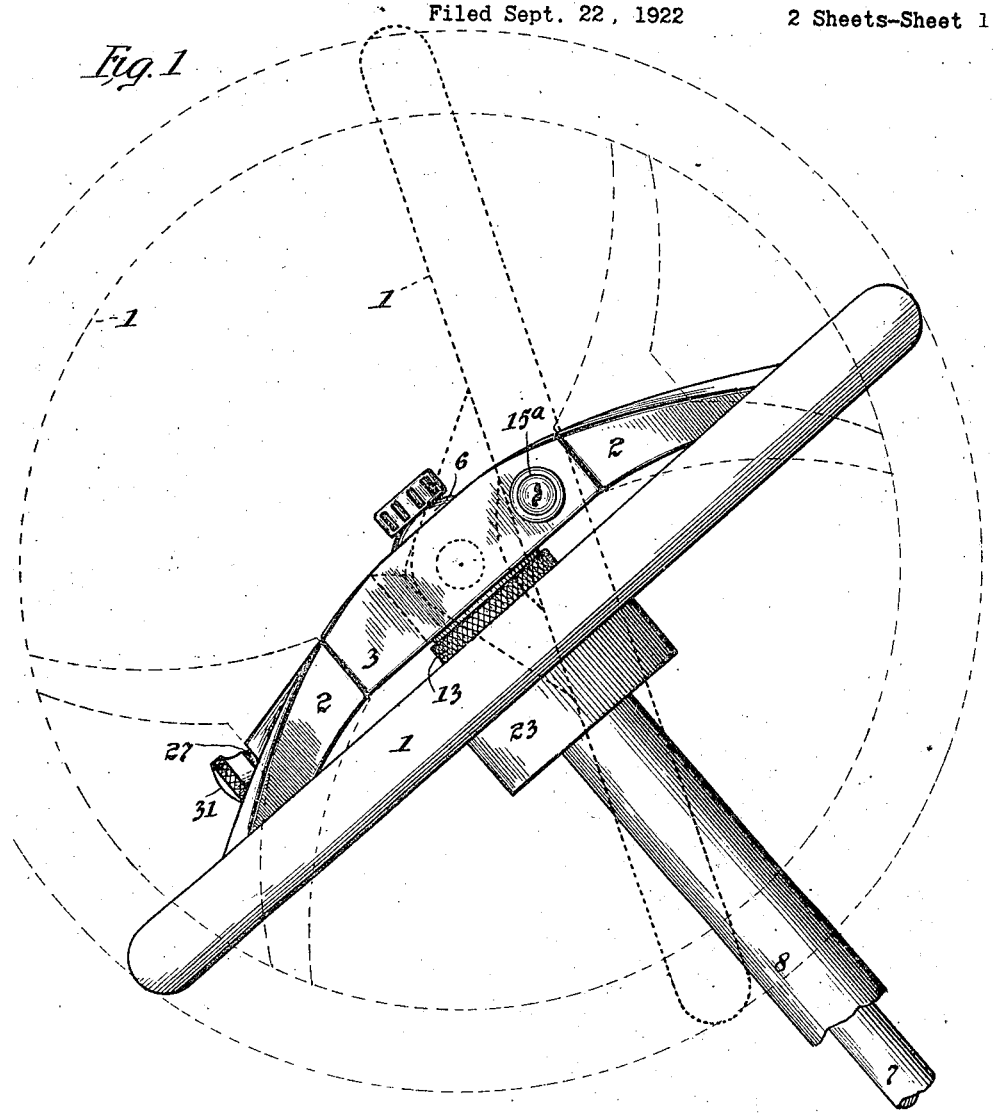
Fig. 1 is a side elevation showing the disposition of parts when the steering wheel is unlocked for free rotation, and indicating tilted positions by dotted lines.
Figure 6:
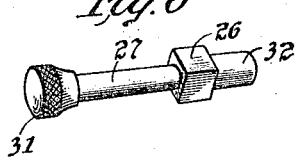
Fig. 6 is a detail perspective view, showing a retractable pin employed in the tilting movement.

The preferred form of construction as shown in the drawings comprises a steering wheel rim 1, and a frame-work in the form of two substantially V-shaped members 2, the free ends of which are secured to said rim, as shown in Fig. 2. Interposed between members 2 is a hub 3 having a central bore 4 and a shoulder 5, there being a cap or closure 6 for said bore which may be so constructed as to serve as an electrical switch for ignition or other purposes.

A steering post 7 suitably journaled in a stationary sleeve 8 is provided with a collar 9 and a retaining washer 10, both of which are securely fastened to the post by means of a nut 11. Collar 9 is loosely fitted in the bore 4, and washer 10 engages shoulder 5, the collar having a flange 12 at the lower end for supporting hub 3. From this construction, it will be seen that hub 3 is free to rotate without moving steering post 7.

A gravity-operated locking ring 13 surrounds collar 9, and is held in the elevated unlocking position by means of a spring-pressed pin 14 which automatically engages a peripheral notch 15 formed in the ring when it registers therewith, the ring being exteriorly knurled to facilitate a good grip by the operator in raising the same. Since pin 14 is entirely concealed, it cannot be tampered with by unauthorized persons in any attempt to lock the steering wheel. This can be accomplished only by turning a lock 15ª by means of a key, which action retracts pin 14 by means of the movement of a projecting stud 16 in a lateral recess 17 of said pin, as will be clear by reference to Figs. 2 and 5. After pin 14 is retracted by the lock action, ring 13 will fall into the dotted position, as shown in Fig. 3, thus locking the steering wheel to its post. This locking action is effected by the engagement of three hexagonal surfaces 18, 19 and 20, surface 18 being on the exterior of flange 12, as shown in Fig. 4, and surfaces 19 and 20 being the exterior of a depending flange 21 and the interior of ring 13, respectively. When ring 13 assumes the dotted position, the interior hexagonal surface thereof engages not only flange 21 but also flange 12, and the downward movement of the ring is arrested by a shoulder 22 on a drum 23, which serves as a housing for spark and throttle levers, not shown.

The tilting movement comprises a trunnion 24 projecting from one end of hub 3 into a member 2, and a recess or bearing 25 at the other end of said hub, both the trunnion and recess being disposed in a plane lying in the steering post axis. The outer end 25ª of recess 25 is enlarged and squared to fit a medial square portion 26 of a locking pin 27, as shown in Fig. 3. Locking pin 27 is adapted to reciprocate in a bore 28 of a member 2, and the square portion 26 thereof in a squared recess 29, there being a helical spring 30 surrounding said pin and engaging square portion 26 for normally pressing the same into squared recess 25ª for locking the wheel against tilting movement, as shown.

In order to retract pin 27 for permitting a tilting movement of the steering wheel, a knob or handle 31 is grasped by the operator and pulled into the dotted position, thus bringing square portion 26 fully into recess 29 and out of recess 25ª, whereby an end 32 on pin 27 serves as a trunnion for cooperation with trunnion 24, on which the wheel is freely tilted by the operator.

From the foregoing description, it will be seen that the steering wheel may be brought into any desired angular position around the steering post; the combination of the rotative and tilting movements being such that independent of concurrent operation may be effected, as desired by the operator. The heavy dotted lines in Fig. 1 indicate the tilted position generally used by a driver, and the light dotted lines indicate another tilted position perpendicular to the first: it being apparent that any desired intermediate position between these two extreme positions may be obtained at the will of the operator.

While I have shown and described the preferred construction for carrying my invention into effect, there might be variations and modifications without departing from the spirit of the invention.

I, therefore, do not wish to limit myself to the precise details of construction set forth, but desire to avail myself of such variations and modifications as come within the scope of the appended claims.

Having described my invention, what I claim as new is:

1. A tilting steering wheel comprising a rim and a pair of members secured thereto, a hub having a trunnion journaled in one of said members, and a retractable spring-pressed pin mounted in the other member adapted to serve both as a trunnion for cooperation with said first-named trunnion and a locking means for securing said hub to said members.

2. A tilting steering wheel comprising a rim, a pair of substantially V-shaped members extending inwardly from said rim and having the free ends thereof secured thereto, a hub interposed between said members, a trunnion on said hub journaled in one of said members, a rectractable spring-pressed pin mounted in the other member and projecting into said hub, there being squared recesses in said hub and one of said members, and a square portion on said pin adapted to engage said recesses for locking said rim relative to said hub.

3. A tilting steering wheel comprising a circular rim and a pair of opposed members extending inwardly therefrom, a hub interposed between said members, a steering post to which said hub is releasably secured, a diametrical trunnion on said hub journaled in one of said members, a diametrical retractable spring-pressed pin mounted in the other member and projecting into said hub, there being squared recesses in said last-named member and hub, and an enlarged square portion on said pin for engagement with said recesses.

4. A tilting steering wheel comprising a rim and a concentric hub, members secured to said rim and extending inwardly to said hub, a trunnion on said hub projecting into one member, a rectractable manually operable spring-pressed pin mounted in the other member and projecting into said hub in alinement with said trunnion, there being squared recesses in said last-named member and hub, and a squared portion on said pin normally engaging said recesses, retraction of the pin freeing one recess.

In witness whereof, I have hereunto set my hand this 31st day of August, 1922.

RUDOLPH R. GRAEBERT.